United States Patent
Arrighetti

(10) Patent No.: US 10,715,836 B2
(45) Date of Patent: Jul. 14, 2020

(54) METHOD AND APPARATUS FOR DELOCALIZED MANAGEMENT OF VIDEO DATA

(71) Applicant: INTERDIGITAL CE PATENT HOLDINGS, SAS

(72) Inventor: Walter Arrighetti, Rome (IT)

(73) Assignee: INTERDIGITAL CE PATENT HOLDINGS, SAS, Paris (FR)

(*) Notice: Subject to any disclaimer, the term of this patent is extended or adjusted under 35 U.S.C. 154(b) by 87 days.

(21) Appl. No.: 15/328,873

(22) PCT Filed: Jul. 10, 2015

(86) PCT No.: PCT/EP2015/065897
§ 371 (c)(1),
(2) Date: Jan. 24, 2017

(87) PCT Pub. No.: WO2016/012286
PCT Pub. Date: Jan. 28, 2016

(65) Prior Publication Data
US 2017/0214944 A1    Jul. 27, 2017

(30) Foreign Application Priority Data
Jul. 24, 2014 (EP) .................................. 14306196

(51) Int. Cl.
*G06F 15/177* (2006.01)
*H04N 21/218* (2011.01)
(Continued)

(52) U.S. Cl.
CPC ......... *H04N 21/2181* (2013.01); *G06F 16/78* (2019.01); *G06F 16/785* (2019.01);
(Continued)

(58) Field of Classification Search
CPC ............. H04N 21/2181; H04N 21/231; H04N 21/274; H04N 21/8352; H04N 21/84;
(Continued)

(56) References Cited

U.S. PATENT DOCUMENTS 5,649,171 A    7/1997   Craven et al.
8,463,845 B2   6/2013   Bury et al.
(Continued)

FOREIGN PATENT DOCUMENTS

JP    2010035073    2/2010
WO    WO2006016282  2/2006

*Primary Examiner* — Tan Doan
(74) *Attorney, Agent, or Firm* — Invention Mine LLC

(57) ABSTRACT

A method for managing video data in a storage system (10), the video data comprising frames, and a storage system (10) configured to perform the method are described. The storage system (10) comprises a first input (11) configured to receive (1) one or more frames for storage. A storage more frames unit (12) stores (2) the one or more frames, whereas a unique identifier generator (13) associates (3) a unique identifier to each of the one or more frames. The storage system (10) further comprises a processor (14) configured to generate (4) a modified frame by processing one or more frames or to receive a modified frame generated externally. The unique identifier generator (13) associates (5) a derived unique identifier to such a modified frame, which comprises references to the unique identifiers of the one or more processed frames.

17 Claims, 1 Drawing Sheet

(51) Int. Cl.
    *G06F 16/78*     (2019.01)
    *G06F 16/783*     (2019.01)
    *H04N 21/84*     (2011.01)
    *H04N 21/231*     (2011.01)
    *H04N 21/274*     (2011.01)
    *H04N 21/8352*     (2011.01)
    *G11B 27/10*     (2006.01)
    *G11B 27/031*     (2006.01)
    *G11B 27/34*     (2006.01)
    *H04L 29/08*     (2006.01)
    *H04N 5/222*     (2006.01)

(52) U.S. Cl.
    CPC ............ *G11B 27/031* (2013.01); *G11B 27/10* (2013.01); *G11B 27/34* (2013.01); *H04L 67/1097* (2013.01); *H04N 21/231* (2013.01); *H04N 21/274* (2013.01); *H04N 21/8352* (2013.01); *H04N 21/84* (2013.01); *H04N 5/222* (2013.01)

(58) Field of Classification Search
    CPC ....... H04N 21/21815; H04N 21/23109; H04N 21/854; H04N 5/222; G06F 17/30802; G06F 17/30817; G06F 17/30017; G06F 17/30864; G06F 17/30873; G06F 17/30902; G06F 16/9535; G11B 27/031; G11B 27/10; G11B 27/34; H04L 67/22; H04L 43/062; H04L 67/20; H04L 67/1097; G06Q 30/02
    USPC ........................................................ 709/219
    See application file for complete search history.

(56) References Cited

U.S. PATENT DOCUMENTS

| | | | |
|---|---|---|---|
| 8,615,517 | B1 | 12/2013 | Vice et al. |
| 2003/0110126 | A1* | 6/2003 | Dunkeld ................ G06Q 10/10 705/39 |
| 2004/0199578 | A1* | 10/2004 | Kapczynski ...... G06F 17/30017 709/203 |
| 2010/0281384 | A1 | 11/2010 | Lyons et al. |
| 2011/0026899 | A1 | 2/2011 | Lussier et al. |
| 2012/0209889 | A1 | 8/2012 | Agnoli et al. |
| 2014/0086408 | A1* | 3/2014 | Bickmore ........ H04N 21/42684 380/210 |
| 2014/0193027 | A1* | 7/2014 | Scherf ................ G06K 9/00711 382/100 |
| 2014/0196085 | A1* | 7/2014 | Dunker ............ H04N 21/23424 725/36 |
| 2014/0324845 | A1* | 10/2014 | Bronstein ......... G06F 17/30799 707/724 |

* cited by examiner

METHOD AND APPARATUS FOR DELOCALIZED MANAGEMENT OF VIDEO DATA

This application claims the benefit, under 35 U.S.C. § 365 of International Application PCT/EP2015/065897 filed Jul. 10, 2015, which was published in accordance with PCT Article 21(2) on Jan. 28, 2016, in English, and which claims the benefit of European Application No. 14306196.8 filed Jul. 24, 2014. The European and PCT applications are expressly incorporated by reference herein in their entirety for all purposes.

FIELD OF THE INVENTION

The invention relates to a method and an apparatus for handling data in a storage system, and more specifically to a method and an apparatus for delocalized management of video data comprising frames.

BACKGROUND OF THE INVENTION

Video assets produced during an average motion picture production can range from a few Terabytes (TB) up to hundreds of Terabytes. The actual amount of data depends on a variety of key factors, like the technical specs of the original camera footage, mainly the resolution and the compression ratio, if any, as well as on production numbers, like the number of location, cameras, script, editing requirements, director's bias, etc. Due to security requirements and to the massive amount of data these data are traditionally handled on local direct-attached storage. However, even with multiple backup copies, it is difficult to manage those huge assets.

It would thus be desirable to have a professional storage service, e.g. a cloud-based storage solution, capable of handling the huge amount of assets.

SUMMARY OF THE INVENTION

It is an object of the present invention to propose an improved solution for handling video data comprising frames in a storage system.

According to one aspect of the invention, a method for managing video data in a storage system, the video data comprising frames, comprises:
  storing one or more frames in the storage system; and
  associating a unique identifier to each of the one or more frames.

In one embodiment, the method further comprises:
  generating a modified frame by processing one or more frames stored in the storage system; and
  associating a derived unique identifier to the modified frame, wherein the derived unique identifier comprises references to the unique identifiers of the one or more processed frames.

Accordingly, a storage system configured to manage video data, the video data comprising frames, comprises:
  a first input configured to receive one or more frames for storage;
  a storage unit configured to store the one or more frames; and
  a unique identifier generator configured to associate a unique identifier to each of the one or more frames.

In one embodiment the storage system further comprises a processor configured to generate a modified frame by processing one or more frames or to receive a modified frame generated externally, wherein the unique identifier generator is configured to associate a derived unique identifier to the modified frame, the derived unique identifier comprising references to the unique identifiers of the one or more processed frames.

Also, a computer readable storage medium has stored therein instructions enabling managing video data in a storage system, the video data comprising frames, which, when executed by a computer, cause the computer to:
  store one or more frames in the storage system; and
  associate a unique identifier to each of the one or more frames.

In one embodiment the computer readable storage medium has further stored therein instructions, which, when executed by a computer, cause the computer to:
  generate a modified frame by processing one or more frames stored in the storage system; and
  associate a derived unique identifier to the modified frame, wherein the derived unique identifier comprises references to the unique identifiers of the one or more processed frames.

A centralized, preferably cloud-based storage solution is proposed. Using a unified system that is shared among cooperating facilities, every frame of the stored video data is identified with a unique ID, e.g. a UUID (UUID: Universally Unique Identifier) or a KeyCode. The storage solution takes care of a secure segregation of video storage from video acquisition and can be leased as a service. Use of unique IDs for the frames benefits especially frame management that is done across multiple facilities, which are not necessarily all within the same company.

The storage solution is preferably used to manage client assets, e.g. original camera footage as shot daily by the digital cameras ('dailies') as early as on-set. Once the footage is ingested, it is preferably fully managed by the provider of the storage solution, including deliveries to end parties for final distribution as well as backup copies. The client is thus provided with a unique infrastructure that manages its video assets from the acquisition via post-production to the final delivery via broadcast, digital cinema, VoD platforms etc. Different versions of the stored video data, i.e. different compilations, are automatically provided to the editors, to the post-production and VFX (VFX: Visual Effects) facilities worldwide.

Though the proposed video footage storage solution is especially advantageous for post-production workflows, it can also be integrated within a transcoding infrastructure, i.e. within distribution workflows for finalized material. This has the advantage that the original footage, with highest quality, raw and unprocessed, is retained in the storage system for as long as possible. To every requesting peer the smallest transcoded resolution copies are provided as required by the specific individual kind of media processing. Examples of transcoded resolution copies are:
  sub-HD for approval of shots by the Production
  HD or sub-HD for Internet distribution
  HD for third-party CDNs (CDN: Content Delivery Network) and aggregators;
  HD for offline editing;
  2K for online editing (conforming) and 2K remote grading;
  4K for VFX plates,
  HD for broadcast HDTV masters
  4K for UHDTV masters
  2K or 4K for DCDM (DCDM: Digital Cinema Delivery Master)

In one embodiment the different transcoded resolution copies are stored on different servers. In this case the unique identifier helps to distinguish the same footage when stored on different servers or different parts of the same footage when it is distributed across several servers.

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims.

DETAILED DESCRIPTION OF PREFERRED EMBODIMENTS

In the following the invention shall be explained with reference to video data in the frame of professional services. Of course, the proposed solution can be easily applied to content delivery networks, video aggregation systems, or multimedia-oriented data centers.

Figure 1:
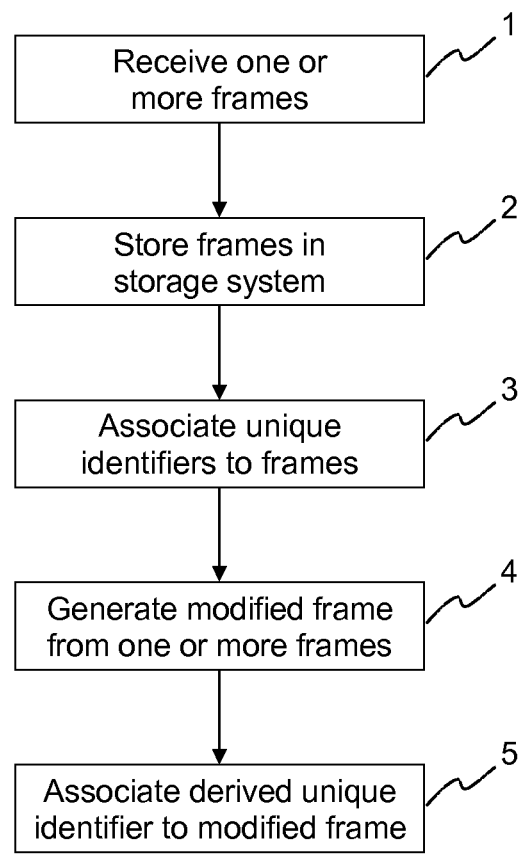
FIG. 1 schematically illustrates a method according to the invention for managing video data in a storage system.

A method according to the invention for managing video data in a storage system is schematically depicted in FIG. 1. The video data comprises frames. When one or more of those frames are received 1 and stored 2 in the storage system 10, a unique identifier is associated 3 to each of the one or more frames. When later a modified frame is generated 4 by processing one or more frames stored in the storage system 10, a derived unique identifier is associated 5 to the modified frame. The derived unique identifier comprises references to the unique identifiers of the one or more processed frames and thus allows to trace back each frame to its original source or sources.

Figure 2:
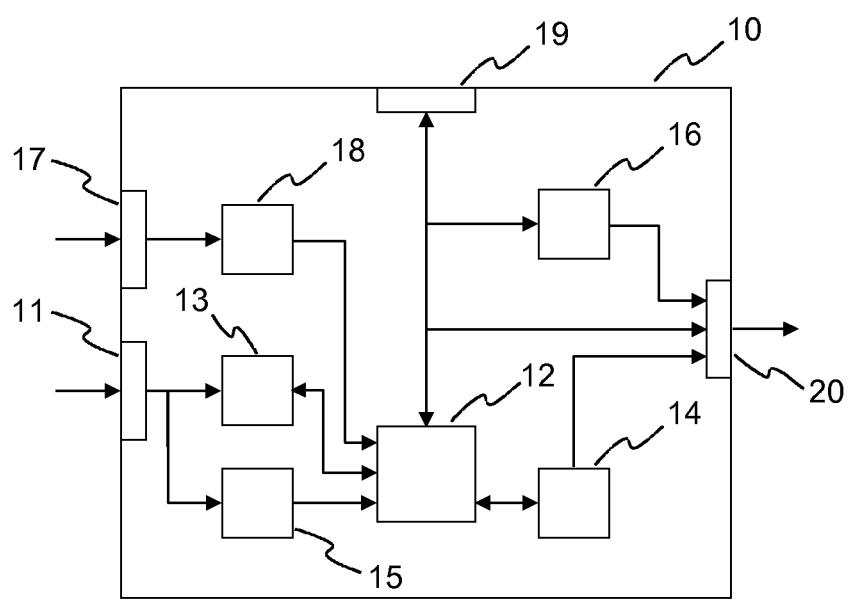
FIG. 2 schematically illustrates a storage system configured to perform a method according to the invention.

A storage system 10 configured to implement a method according to the invention is schematically illustrated in FIG. 2. The storage system 10 comprises a first input 11 configured to receive 1 one or more frames for storage, e.g. from an attached storage device or a network (not shown). A storage unit 12 stores 2 the one or more frames, whereas a unique identifier generator 13 associates 3 a unique identifier to each of the one or more frames. The storage system 10 preferably further comprises a processor 14 configured to generate 4 a modified frame by processing one or more frames or to receive a modified frame generated externally. The unique identifier generator 13 associates 5 a derived unique identifier to such a modified frame, which comprises references to the unique identifiers of the one or more processed frames. Advantageously the storage system 10 further comprises at least one of a color analyzer 15 for generating and storing color metadata for the one or more frames, a transcoder 16 for generating a transcoded version of a frame, a second input 17 for receiving a request to provide video data for processing, and a frame determiner 18 for determining one or more frames required for processing the requested video data. The various data generated or stored in the storage system are preferably accessible via a user interface 19 and/or made available via an output 20. The different components of the storage system 10 are either implemented as dedicated hardware or at least partially as software running on a processor. In addition, the various components may be fully or partially combined into a one or more multi-purpose components. For example, the first input 11, the second input 17, and the output 20 may be combined into a single bi-directional interface.

As indicated before, video assets produced during an average motion picture show can range from a few TeraBytes (TB) up to hundreds of TeraBytes. In order to manage these assets a centralized, preferably cloud-based storage system is proposed. In this system the footage is processed in a manner similar to an internal professional CDN. Tasks performed by the system involve, but are not limited to:

1) Ingestion of original camera footage from physical storage, such as RAID bays, Thunderbolt drives, etc., carried from the set to the nearest Data I/O point. For example, the Data I/O point may be a data center managed by the provider of the storage system or a facility connected to a network of the provider. Such storage, preferably block-level encrypted, can be plugged into proprietary bays to carry on with high-speed ingestion using up-to-date data-transfer technologies and high-speed upload to the provider's cloud service via its network. This ingestion path can be most effective for on-set locations which have normal to sub-normal wireless connectivity, or for uncompressed raw footage, which is very huge for current networking technologies.

Ingestion of original camera footage via a secured/encrypted Internet stream directly from an on-set location with a high-speed transmission, like 4G LTE, etc. This ingestion path can be most effective for facilities with high-performance or future network technologies, or where original raw footage has native high compression standards.

Assigning to each video frame of every asset a unique identifier that goes along any frame to uniquely identify it.

In case the frame is modified, e.g. resized, cut, composited, color-corrected, compressed or otherwise destructively transcoded, a derived identifier is assigned to the frame so that the frame can always be sourced from the original raw-footage ingested as described above. Per-asset and per-frame unique identifiers are also useful for security and content protection purposes. Providing a derived frame with a derived unique identifier, which allows to trace back to the original frame's unique identifier, is advantageous in case legal, auditory or asset-tracing inquiries are requested for, say, forensic or anti-piracy reasons. The derived unique identifier allows to trace back each frame to its original source. Where a frame originates from more than one original frame, e.g. by compositing different background and foreground frames, the derived unique identifier of the derived frame allows to trace back all original sources.

Unique and integrated color management and color science of the frames, where color metadata are stored in the system and keep track of every color transformation, both for creative and technical intents, so that dynamic range, color fidelity and the widest possible gamut can, in principle, always be retrieved. This integrated color-management system advantageously is compatible with existing open formats like OpenLUT, ACES (ACES: Academy Color Encoding System), CDL (CDL: Color Decision List), Technicolor Global LUT Management, and OpenColorIO.

Database queries: The database can be queried and logs/reports can be generated in either web-page (HTML+CSS) or pure XML format in a dedicated, open and extensible dialect.

Transcoding of video from the original, unedited high-resolution "raw" formats with potentially high frame resolution, deep color bit-depth, and wide gamut, to multiple formats, like:

Low-resolution, low-color depth, standard color space proxies for production review and offline editorial; This format is, for example, sent to production key figures including the director and/or the editors.

Medium-resolution, low color-depth, wide-gamut color space proxies for initial post-production processing, such as color pre-grading.

Either non-transcoded or anyway highest-quality video footage for inter-company facilities that take care of the high-end post-production workflows or plates for visual effects.

Either non-transcoded or anyway highest-quality video to be sent to partner post-production or VFX facilities that co-work on the same project.

The different transcoded version may be stored stored on different servers. In this case the unique identifier helps to distinguish the same footage when stored on different servers or different parts of the same footage when it is distributed across several servers.

Final assets, as worked upon and offline-edited, e.g. by joining shots, plates, titles, etc., can be versioned and finalized, then uplinked to the same storage system, which provide front-end transcodes for:

Transcoding into DCDM or directly to original-version DCPs (DCP: Digital Cinema Package) for Digital Cinema deliveries.

Broadcast-based master formats, both wrapper and essences, such as OP1a (OP1a: Material Exchange Format Operational Pattern 1a), H.264, HEVC (HEVC: High Efficiency Video Coding), IMF (IMF: Interoperable Master Format), etc.

Distribution formats for aggregators and front-end based third-party CDNs.

Generation and retention of long-term backup copies of assets, e.g. vaulted LTO tapes (LTO: Linear Tape Open), as well as scheduled file-based removal of old assets when a project is closed.

Generation of watermark and security seals for frames that need to be sent to any parties outside of the company, e.g. producers, ad agencies, external post-production or VFX facilities, third-party CDNs or aggregators, etc.

Generation of certificates for certified media players, like STBs, special online platforms, as well as digital cinema servers/players, to enforce DRM (DRM: Digital Rights Management) and KDM (KDM: Key Delivery Messages) that allow content to be viewed only on specific devices and only within certain specific time frames.

When needed for online editing or re-edits, known as 'conforming' in the field of post-production, only the specific frames that are part of the actual cuts used can be automatically retrieved from the storage system. If required, additional handle frames can also be retrieved. This saves throughput during transfers and storage occupation when deduplicating frames. All the frames belonging to shot clips that will not be used for a specific asset, such as wrong takes, alternate takes, tests, bad claps, etc., will not be considered for transfer. The pre-conforming phase is thus performed within the storage system, not in the post-production facility. This approach spares time for data transfer, time for manual conforming and space for storing unnecessary video frames.

Preparation of MXF essence (MXF: Material Exchange Format) for remote grading sessions, where the colorist and the client can color-correct footage that is remotely available on the storage system and is projected in a screening room at the location of the colorist.

In order to ensure a reliable frame management, a unique identifier, e.g. a KeyCode, is associated with every original frame. This unique identifier remains with the frame all along the pipeline. The unique identifier allows for derived identifiers, i.e. a new identifier that chain-references to the identifier of the original frame or frames. However, the derived identifier specifies that a different version of the frame has been generated, e.g. a cut, re-colored, or otherwise altered version. This references can be traced back to the original footage frame or frames.

The network infrastructure of the proposed storage system needs to abide to strict security requirements as they relate to content protection. To this end the infrastructure that holds the original footage is preferably segregated from the infrastructure that makes available the watermarked or digital rights managed, lower-resolution data for external clients to download. Also the infrastructure that allows high-resolution data to be sent to external facilities for post-production or VFX works is favorably segregated from the remaining infrastructure. The infrastructure that faces internal facilities of the provider of the storage solution is segregated from the two above and connected to the providers internal network.

The infrastructure that takes care of transcoding employs either a workflow manager or file-based workflows and is favorably segregated from the storage-only infrastructure of the storage system as described above. It is able to process assets according to specific delivery timelines, not necessarily according to queuing in the order of upload. Advantageously, a transcoding manager is used, which is aware of the source file formats as well as of the multiple target file formats for the transcodes and prioritizes the transcoding tasks according to the delivery schedule. This includes, but is not limited to, considerations such as:

If footage A needs to be transcoded to B in format x and C in format y, but format x can be encoded faster, then proceed to transcode B first.

If the footage will need to be transcoded to D in format z with lowest priority, but both C and D can be transcoded faster if an intermediate transcode is done to a format w, from which transcodes to both formats y and z are performed faster, then proceed with the intermediate transcode, as soon as highest-priority B is complete.

The invention claimed is:

1. A method for managing video data in a storage system, the video data comprising frames, the method comprising:
   storing one or more frames in the storage system;
   associating a unique identifier with each of the one or more frames;
   generating one or more modified frames by processing one or more frames stored in the storage system; and
   associating a derived unique identifier with each modified frame, wherein the derived unique identifier comprises references to the unique identifiers of the one or more processed frames.

2. The method according to claim 1, wherein the derived identifier enables tracing the modified frame back to one or more original sources from which the modified frame has been generated.

3. The method according to claim 1, further comprising generating and storing color metadata for the one or more frames when storing the one or more frames in the storage system.

4. The method according to claim 1, further comprising generating a transcoded version of a frame and making the transcoded version available at an output of the storage system.

5. The method according to claim 4, wherein different transcoded versions of a frame are provided to different servers of the storage system.

6. The method according to claim 1, further comprising:
receiving a request to provide video data for processing;
determining one or more frames required for processing the requested video data; and
making the determined one or more frames available at an output of the storage system.

7. The method of claim 1, wherein the derived unique identifier of at least one modified frame, of the one or more modified frames, comprises references to multiple unique identifiers.

8. The method of claim 1, further comprising storing the one or more modified frames on a different server.

9. A storage system configured to manage video data, the video data comprising frames, the storage system comprising:
a first input configured to receive one or more frames for storage;
a storage unit configured to store the one or more frames;
a processor configured to generate one or more modified frames by processing one or more frames or to receive a modified frame generated externally; and
a unique identifier generator configured to associate a unique identifier with each of the one or more frames and to associate a derived unique identifier with each modified frame wherein the derived unique identifier comprises references to the unique identifiers of the one or more processed frames.

10. The storage system according to claim 9, wherein the derived identifier enables tracing the modified frame back to one or more original sources from which the modified frame has been generated.

11. The storage system according to claim 9, further comprising a color analyzer configured to generate and store color metadata for the one or more frames.

12. The storage system according to claim 9, further comprising a transcoder configured to generate a transcoded version of a frame.

13. The storage system according to claim 9, further comprising:
a second input configured to receive a request to provide video data for processing; and
a frame determiner configured to determine one or more frames required for processing the requested video data.

14. The storage system according to claim 9, wherein the storage system comprises at least one of a segregated section for external access to watermarked or digital rights managed video data, a segregated section for external access to high-resolution video data, and a segregated section for internal access to video data.

15. The system of claim 9, wherein the derived unique identifier of at least one modified frame, of the one or more modified frames, comprises references to multiple unique identifiers.

16. The system of claim 9, wherein the storage unit is further configured to store the one or more modified frames on a different server.

17. A non-transitory computer readable storage medium having stored therein instructions enabling managing video data in a storage system, the video data comprising frames, which, when executed by a computer, cause the computer to:
store one or more frames in the storage system;
associate a unique identifier with each of the one or more frames;
generate one or more modified frames by processing one or more frames stored in the storage system; and
associate a derived unique identifier with each modified frame wherein the derived unique identifier comprises references to the unique identifiers of the one or more processed frames.

* * * * *